Figure 1:
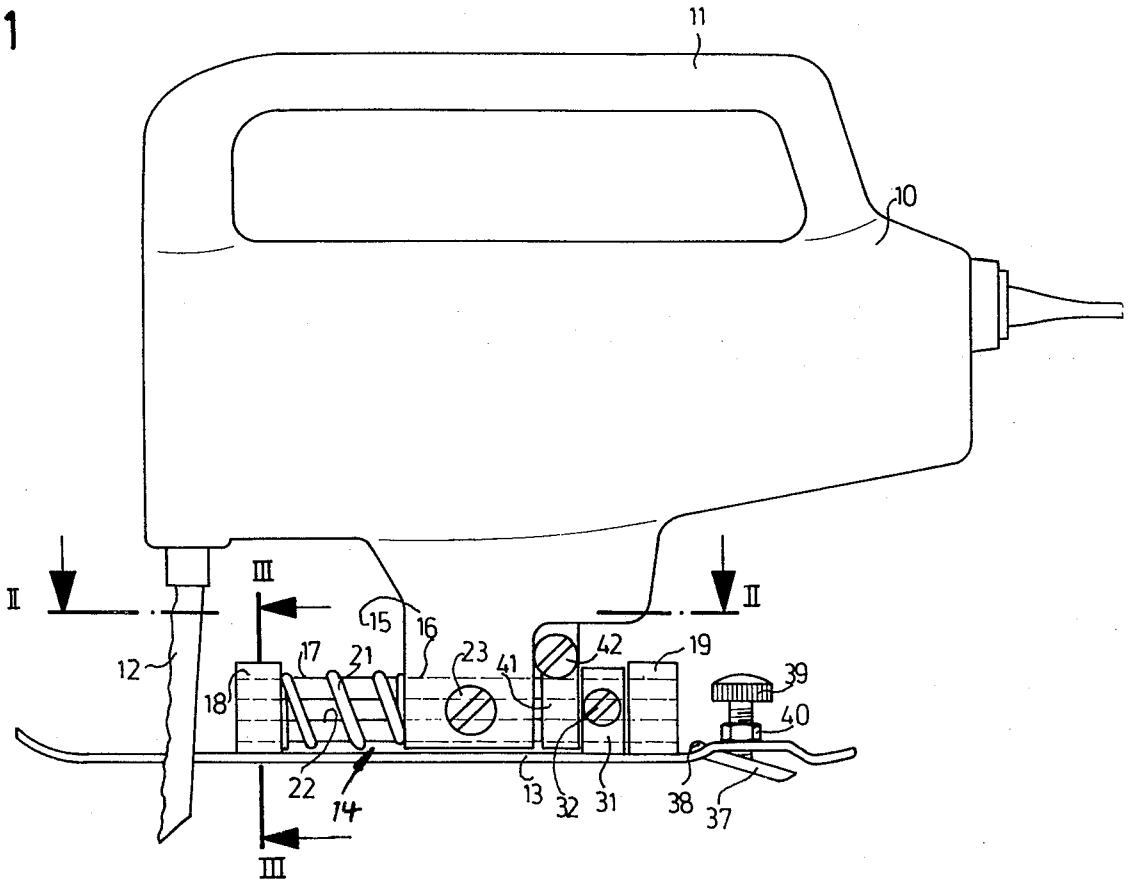
Figure 2:
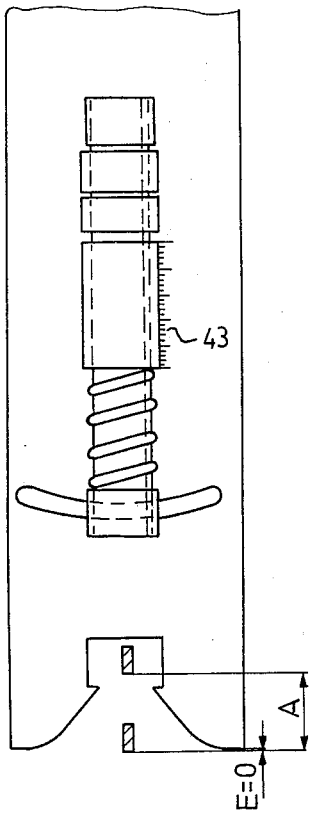
Figure 3:
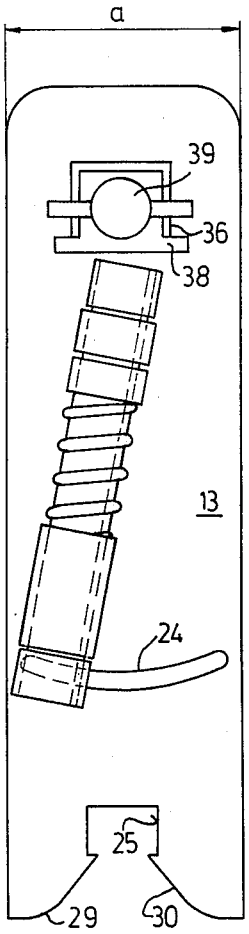
Figure 4:
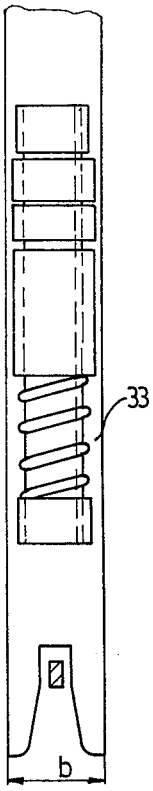
Figure 5:
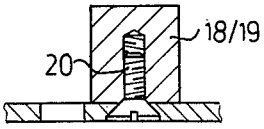
Figure 7:
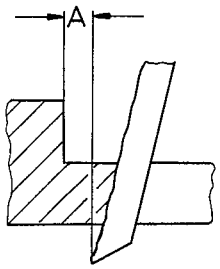
Figure 6:
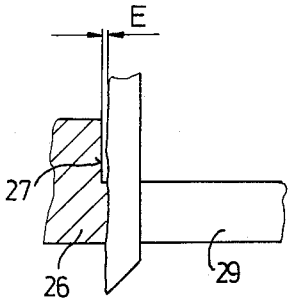
Figure 8:
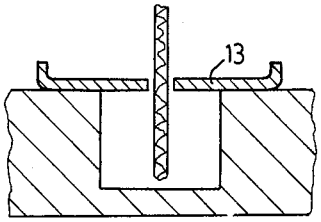
Figure 9:
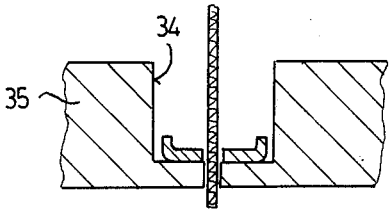

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 9

T941,019
POWER TOOL

Ernst Kränzler, Stetten, Filder, and Gerhard Kuhlmann, Stuttgart, Germany, assignors to Robert Bosch G.m.b.H., Stuttgart, Germany

Filed Oct. 17, 1974, Ser. No. 515,711
Claims priority, application Germany, Oct. 27, 1973, G 73 38 651.3
Int. Cl. B27b *11/02*
U.S. Cl. 30—376
3 Sheets Drawing. 16 Pages Specification

Fig.1

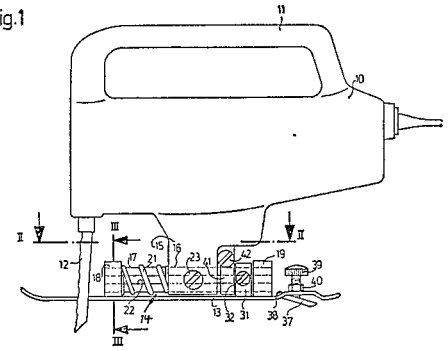

A power tool, e.g., a saber saw, has a base plate which is to be placed onto a workpiece. The tool body, including a housing, a drive, a tool and other components, is mounted on the base plate for arrestable displacement relative to the base plate to a limited extent so that, even though it may not be possible to move the base relative to the workpiece, e.g., because an edge or surface of the workpiece prevents this, the tool body can be moved relative to the base plate. The tool body may be mounted for relative movement in the longitudinal direction of the base plate and/or for swiveling movement in transverse direction. Further, the tool body may also be mounted to be arrestably pivotable relative to the base plate about a horizontal axis, to permit the angle included between the tool (e.g., a sawblade) and the workpiece surface to be varied. The base plate may be releasably connected with the tool body and a narrow base plate may additionally be furnished which can be connected with the tool body when it is desired to be able to insert the base plate in its entirety into a groove.